Patented Aug. 15, 1950

2,519,001

UNITED STATES PATENT OFFICE 2,519,001

MEROCYANINE DYES CONTAINING A CARBOXYALKYL GROUP OR A SULFOALKYL GROUP

Robert H. Sprague, Rochester, N. Y., assignor to Eastman Kodak Company, Rochester, N. Y., a corporation of New Jersey No Drawing. Application February 24, 1947, Serial No. 730,565

9 Claims. (Cl. 260—240.4)

This invention relates to merocyanine dyes containing a carboxyalkyl or a sulfoalkyl group on the nitrogen atom of the auxochromophore group.

In merocyanine dyes the auxochromophore group consists of a nitrogen atom (contained in a heterocyclic ring) linked by a conjugated chain of carbon atoms to the oxygen atom of a keto group (i. e. a carbonyl group) which is usually contained in a heterocyclic ring. Merocyanine dyes containing a methyl, an ethyl, an allyl, a benzyl, a β-ethoxyethyl, a β-hydroxyethyl and other alcohol radicals on the nitrogen atom of the auxochromophore group are known. Such known merocyanine dyes are, generally speaking, neutral substances having a tendency to exhibit basic properties.

I have now found a new group of merocyanine dyes which are acidic and which behave in a manner different from the known merocyanine dyes when photographic silver halide emulsions containing them are processed. My new dyes, like the known merocyanine dyes, sensitize photographic silver halide emulsions I have found, but unlike the known merocyanine dyes are substantially removed from the emulsions upon processing in the ordinary alkaline developers, with the result that photographic elements comprising the silver halide emulsions do not carry a residual dye-stain. A few of my new dyes are devoid of sensitizing action but these dyes are of utility as light-screening substances in photographic elements.

It is, accordingly, an object of my invention to provide new merocyanine dyes. A further object is to provide a process for preparing such dyes. Other objects will become apparent hereinafter.

The merocyanine dyes of my invention can be represented by the following general formula:

I.

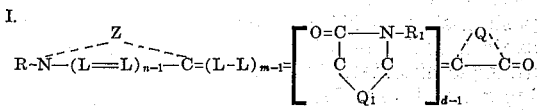

wherein R represents a member selected from the group consisting of carboxyalkyl and sulfoalkyl groups (e. g. a carboxymethyl group, a β-carboxyethyl group, an α-carboxyethyl group, an α,γ-dicarboxypropyl group, a sulfomethyl group, a β-sulfoethyl group, etc.), L represents a methine group, $n$ represents a positive integer of from 1 to 2, $m$ represents a positive integer of from 1 to 4, $Q_1$ represents a member selected from the group consisting of an oxygen atom, a sulfur atom and a $$-\overset{|}{N}-R_2$$

group wherein $R_2$ represents a member selected from the group consisting of an alkyl group (i. e. an alcohol radical) and an aryl group, e. g. methyl, ethyl, n-butyl, phenyl, etc., $R_1$ represents a member selected from the group consisting of an alkyl group (i. e. an alcohol radical) and an aryl group, e. g. methyl, ethyl, n-butyl, n-decyl, lauryl, β-hydroxyethyl, phenyl, p-dimethylaminophenyl, etc., $d$ represents a positive integer of from 1 to 2, and Q represents the non-metallic atoms necessary to complete a heterocyclic nucleus containing from 5 to 6 atoms in the ring. Exemplary of heterocyclic nuclei containing from 5 to 6 atoms in the ring are: rhodanine nuclei (e. g. unsubstituted rhodanine, 3-ethylrhodanine, 3-β-hydroxyethylrhodanine, 3-carboxymethylrhodanine, 3-β-sulfoethylrhodanine, 3-(1,3-dicarboxy-n-propyl)rhodanine, 3-α-carboxyethylrhodanine, 3-p-carboxyphenylrhodanine, 3-(3-carboxy-4-hydroxyphenyl)rhodanine, 3-p-sulfophenylrhodanine, 3-(2,5-disulfophenyl)-rhodanine, 3-phenylrhodanine, 3-p-dimethylaminophenylrhodanine, etc.), 2-thio-2,4(3,5)-oxazoledione nuclei (e. g. 3-ethyl-2-thio-2,4(3,5)-oxazoledione, 3-p-sulfophenyl-2-thio-2,4(3,5)-oxazoledione, 3-carboxymethyl-2-thio-2,4(3,5)-oxazoledione, 3-sulfomethyl-2-thio-2,4(3,5)-oxazoledione, etc.), 2-thiohydantoin nuclei (e. g. unsubstituted 2-thiohydantoin, 1,3-diphenyl-2-thiohydantoin, 3-ethyl-1-phenyl-2-thiohydantoin, 1-methyl-2-thiohydantoin, 1-carboxymethyl-3-phenyl-2-thiohydantoin, etc.), 5-pyrazolone nuclei (e. g. 1-phenyl-3-methyl-5-pyrazolone, 3-methyl-1-(2-benzothiazolyl)-5-pyrazolone, 3-carboxymethyl-1-phenyl-5-pyrazolone, 1-carboxyphenyl-3-methyl-5-pyrazolone, 3-methyl-1-p-sulfophenyl-5-pyrazolone, 1-(4-sulfo-1-naphthyl)-3-methyl-5-pyrazolone, etc.), 4-thiazolidone nuclei, 2-amino-4(5)-thiazolone nuclei (e. g. 2-diphenylamino-4(5)thiazolone, 2-diethylamino-4(5)thiazolone, etc.), 2-alkylmercapto- 4-(5)thiazolone (e. g. 2-methylmercapto-4(5)-thiazolone, 2-ethylmercapto-4(5)thiazole, etc.), barbituric acid nuclei (e. g. unsubstituted barbituric acid, 2-thiobarbituric acid, etc.) and the like. Z represents the non-metallic atoms necessary to complete a heterocyclic nucleus containing from 5 to 6 carbon atoms in the heterocyclic ring, e. g. a nucleus of the benzoxazole series (e. g. benzoxazole, 5-chlorobenzoxazole, 5-bromobenzoxazole, 5-methylbenzoxazole, 5-ethylbenzoxazole, 5-methoxybenzoxazole, 5-ethoxybenzoxazole, 5-acetaminobenzoxazole, 5-phenylbenzoxazole, 6-chlorobenzoxazole, 7-chlorobenzoxazole, etc.), a nucleus of the benzothiazole series (e. g. benzothiazole, 4-chlorobenzthiazole, 7-chlorobenzothiazole, 5-chlorobenzothiazole, 4-phenylbenzothiazole, 4-methoxybenzothiazole, 4-methylbenzothiazole, 5-bromobenzothiazole, 5-acetaminobenzothiazole, 5-iodobenzothiazole, 5-dimethylaminobenzothiazole, 5-methylbenzothiazole, 5-methoxybenzothiazole, 5-ethoxybenzothiazole, 5-phenylbenzothiazole, 6-methylbenzothiazole, 6-chlorobenzothiazole, 6-methoxybenzothiazole, 6-ethoxybenzothiazole, etc.), a nucleus of the benzoselenazole series (e. g. benzoselenazole, 5-chlorobenzoselenazole, etc.), a nucleus of the α-naphthothiazole series, a nucleus of the β-naphthothiazole series, a nucleus of the α-naphthoxazole series, a nucleus of the β-naphthoxazole series, a nucleus of the α-naphthoselenazole series, a nucleus of the β-naphthoselenazole series, a nucleus of the thiazoline series, a nucleus of the simple thiazole series (e. g. 4-methylthiazole, 4-phenylthiazole, 4-(2-thienyl)thiazole, etc.), a nucleus of the simple selenazole series (e. g. 4-methylselenazole, 4-phenylselenazole, etc.), a nucleus of the simple oxazole series (e. g. 4-methyloxazole, 4-phenylthiazole, etc.), a nucleus of the quinoline series (e. g. quinoline, 6-methylquinoline, 6-methoxyquinoline, etc.), a nucleus of the pyridine series, a nucleus of the 3,3-dialkylindolenine series (e. g. 3,3-dimethylindolenine, etc.), etc.

In accordance with my invention, I prepare merocyanine dyes containing a sulfoalkyl or a carboxyalkyl group on the nitrogen atom of the auxochromophore group by condensing a cyclammonium carboxyalkyl or sulfoalkyl quaternary salt containing in the α- or γ-position (i. e. one of the so-called reactive positions) a thioether group, e. g. an alkylthio, an aralkylthio or an arylthio group, or a halogen atom, e. g. a chlorine, a bromine or an iodine atom, with a heterocyclic compound containing from 5 to 6 atoms in the heterocyclic ring and containing a ketomethylene group ($-CO-CH_2$) in the heterocyclic ring, i. e. a heterocyclic compound selected from those having the following general formula:

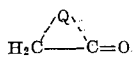

where Q has the value given above. This condensation gives "simple" merocyanine dyes containing on the nitrogen atom of the auxochromophore group a carboxyalkyl or a sulfoalkyl group, i. e. merocyanine dyes of the following general formula:

II.
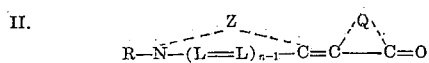

Where R, L, $n$, Q and Z have the values given above.

The condensations are advantageously carried out in the presence of a basic condensing agent, e. g. a tertiary amine, such as pyridine, a trialkylamine or a N-alkylpiperidine. Alkali metal carbonates or alkali metal alcoholates can also be employed. A reaction medium can be employed, e. g. a lower molecular weight alcohol, such as ethyl, n-propyl, isopropyl, n-butyl or isobutyl alcohol.

Simple merocyanine dyes containing a 4-quinoline nucleus and containing on the nitrogen atom of the auxochromophore group a carboxyalkyl or a sulfoalkyl group can also be prepared by condensing a quinoline carboxyalkyl or sulfoalkyl quaternary salt containing no substituent in the 4-position, with a heterocyclic compound containing from 5 to 6 atoms in the heterocyclic ring and containing in the heterocyclic ring a ketomethylene group, in the presence of an alcoholic solution of an alkali metal hydroxide, e. g. potassium hydroxide. Alcohols of the formula $C_nH_{2n+1}OH$ wherein $n$ represents a positive integer of from 1 to 4 are advantageously employed.

In accordance with my invention, I prepare merocyanine dyes of the carbo series (i. e. merocarbocyanine dyes) containing on the nitrogen atom of the auxochromophore group a carboxyalkyl or a sulfoalkyl group by condensing a cyclammonium carboxyalkyl or sulfoalkyl quaternary salt containing in the α- or γ-position (i. e. one of the so-called reactive positions) a β-arylaminovinyl group with a heterocyclic compound containing from 5 to 6 atoms in the heterocyclic ring and containing an intracyclic ketomethylene group, i. e. a heterocyclic compound selected from those having the following general formula:

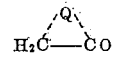

wherein Q has the value given above. The β-arylaminovinyl group is advantageously an acylated β-arylaminovinyl group, e. g. a β-acetanilidovinyl group. This condensation gives merocarbocyanine dyes containing a carboxyalkyl or sulfoalkyl group on the nitrogen atom of the auxochromophore group, i. e. merocyanine dyes of the following general formula:

III.
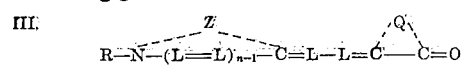

wherein R, L, $n$, Q and Z have the values given above.

The condensations are advantageously carried out in the presence of a basic condensing agent, e. g. a tertiary amine, such as a trimethylamine, triethylene, dimethylaniline, or a N-alkylpiperidine. A reaction medium is advantageously employed, e. g. pyridine or a lower molecular weight alcohol, such as ethyl, n-propyl, isopropyl, n-butyl or isobutyl alcohol. An alkali metal carboxylate in a carboxylic anhydride can also be used as basic condensing agent, e. g. sodium acetate in acetic anhydride.

The above merocarbocyanine dyes can also be prepared by condensing a cyclammonium carboxyalkyl quaternary salt or cyclammonium sulfoalkyl quaternary salt containing in the α- or γ-position (i. e. one of the so-called reactive positions) a $-CH_2R_4$ group wherein $R_4$ represents a hydrogen atom or an alkyl group, with an arylaminomethylene compound of the following general formula:

IV.
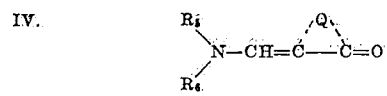

wherein Q has the value given above, $R_5$ represents a member selected from the group consisting of a hydrogen atom, and an acyl group (especially acetyl, propionyl or butyryl) and R₆ represents an aryl group, e. g. phenyl or naphthyl. Typical of such arylaminomethylene compounds are: 5-anilinomethylenerhodanine, 5-acetanilidomethylene - 3 - ethylrhodanine, 5-acetanilido-3-phenylrhodanine, 5-acetanilidomethylene-3-ethyl-2-thio-2,4(3,5)-oxazoledione, 5-acetanilidomethylene - 3 - ethyl-1-phenyl-2-thiohydantoin, 4 - acetanilidomethylene-3-methyl-1-phenyl-5-pyrazolone, 5-acetanilidomethylene-2-diphenylamino-4(5)-thiazolone, etc. The condensations are advantageously carried out in the presence of a basic condensing agent, such as those recited above. A reaction medium of a lower molecular weight alcohol is advantageously employed.

The above merocarbocyanine dyes containing a substituent on the dimethine chain adjacent to the keto heterocyclic nucleus can also be prepared by condensing a cyclammonium carboxyalkyl or sulfoalkyl quaternary salt containing in the α- or γ-position a β-alkylmercaptovinyl group, with a heterocyclic compound containing an intracyclic ketomethylene group and containing from 5 to 6 atoms in the ring. The condensations are advantageously carried out in the presence of a basic condensing agent, e. g. a trialkylamine, a N-alkylpiperidine or an alkali metal carbonate. A reaction medium of a lower molecular weight alcohol is advantageously employed.

In accordance with my invention, I prepare merocyanine dyes of the dicarbo series (i. e. merodicarbocyanine dyes) containing a carboxyalkyl or a sulfoalkyl group on the nitrogen atom of the auxochromophoric group by condensing a cyclammonium carboxyalkyl or sulfoalkyl quaternary salt containing in the α- or γ-position, a 4-arylamino-1,3-butadienyl group with a heterocyclic compound containing from 5 to 6 atoms in the heterocyclic ring and containing a ketomethylene group in the ring. The 4-arylamino-1,3-butadienyl group is advantageously an acylated 4-arylamino-1,3-butadienyl group, e. g. a 4-acetanilido-1,3-butadienyl group. This condensation gives merodicarbocyanine dyes containing a carboxyalkyl or sulfoalkyl group on the nitrogen atom of the auxochromophoric group, i. e. merocyanine dyes of the following general formula:

V. 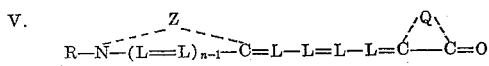

wherein R, L, n, Q and Z have the values given above.

The condensations are advantageously carried out in the presence of a basic condensing agent, e. g. a tertiary amine, such as trimethylamine, triethylamine, dimethylaniline, or a N-alkylpiperidine. A reaction medium is advantageously employed, such as ethyl, n-propyl, isopropyl, n-butyl or isobutyl alcohol. An alkali metal carboxylate in a carboxylic anhydride can also be used as basic condensing agent, e. g. sodium acetate in acetic anhydride.

The above merodicarbocyanine dyes can also be prepared by condensing a cyclammonium carboxyalkyl quaternary salt or a cyclammonium sulfoalkyl quateraray salt containing in the α- or γ-position, a —CH₂—R₄ group wherein R₄ represents a hydrogen atom or an alkyl group, with an arylaminoallylidene compound of the following general formula:

VI. 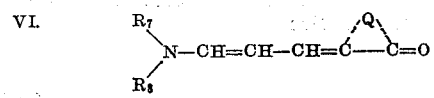

wherein Q has the value given above, R₇ represents a member selected from the group consisting of a hydrogen atom and an acyl group (especially acetyl, propionyl or butyryl) and R₈ represents an aryl group, e. g. phenyl or naphthyl. Typical of such arylaminoallylidene compounds are: 5 - γ - acetanilidoallylidenerhodanine, 5-γ-acetanilidoallylidene - 3 - ethylrhodanine, 5 - γ - acetaniloallylidene - 3 - phenylrhodanine, 5 - γ - acetanilidoallylidene - 3 - laurylrhodanine, 5 - γ - acetanilidoallylidene - 3 - ethylrhodanine, 5 - γ - acetanilidoallylidene - 3 - ethyl-2-thio - 2,4(3,5) - oxazoledione, 5-γ-acetanilidoallylidene-3-ethyl-1-phenyl-2-thiohydantoin, 5-γ-acetanilidoallylidene-1,3-diphenyl-2-thiohydantoin, 5 - γ - acetanilidoallylidene - 2 - diphenylamino - 4(5) - thiazolone 5 - γ - acetanilido,- 2 - ethylphenylamino-4(5)-thiazolone, 4-γ-acetanilidoallylidene-1-(2-benzothiazolyl) - 3 - methyl - 5 - pyrazolone, 4-γ-acetanilidoallylidene-3-methyl-1-phenyl - 5 - pyrazolone, etc. These condensations are advantageously carried out in the presence of a basic condensing agent, e. g. the basic condensing agents set forth above under merodicarbocyanine dyes.

In accordance with my invention, I prepare merotricarbocyanine dyes by condensing a cyclammonium carboxyalkyl quaternary salt or cyclammonium sulfoalkyl quaternary salt containing in the α- or γ-position (i. e. one of the so-called reactive positions) a —CH₂—R₄ group wherein R₄ represents a hydrogen atom or an alkyl group, with an arylamino-2,4-pentadienylidene compound of the following general formula:

VII. 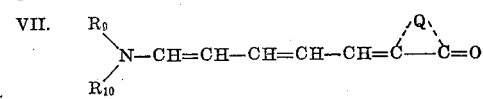

wherein Q has the value given above, R₉ represents a member selected from the group consisting of a hydrogen atom and an acyl group (especially acetyl, propionyl or butyryl) and R₁₀ represents an aryl group, e. g. phenyl or naphthyl. Typical of such arylamino-2,4-pentadienylidene compounds are: 5-(5-acetanilido-2,4-pentadienylidiene)-3-ethylrhodanine, 5 - (5 - acetanilido-2,4-pentadienylidene)-2-thiobarbituric acid, 5-(5-acetanilido-2,4-pentadienylidene) - 3 - ethyl - 2-thio-2,4(3,5) - oxazoledione, 5 - (5 - acetanilido-2,4 - pentadienylidene)-1,3-diphenyl - 2 - thiohydantoin, 5-(5-acetanilido-2,4-pentadienylidene-2-ethylphenylamino-4(5)-thiazolone, 4-(5-acetanilido - 2,4 - pentadienylidene) - 3 - methyl - 1 -phenyl-5-pyrazolone, etc. The condensations are advantageously carried out in the presence of a basic condensing agent, e. g. the basic condensing agents set forth above under merodicarbocyanine dyes.

In accordance with my invention, I prepare merocyanine dyes containing more than two heterocyclic nuclei by treating a merocyanine dye of the following general formula:

IX. 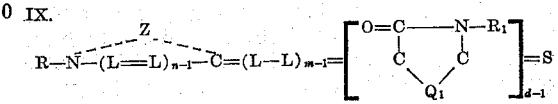

wherein R, R₁, n, Z, m and Q₁ have the values recited above, and $d$ represents a positive integer of from 2 to 3 with an alkyl salt to obtain a quaternary alkylmercapto compound of the following general formula:

X.

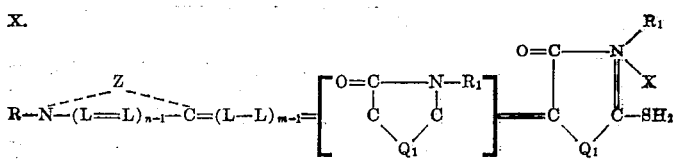 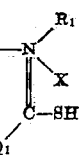

wherein R, L, $n$, $m$, $R_1$, $Q_1$ and Z have the values recited above, $R_2$ represents an alcohol radical (i. e. an alkyl group substituted or unsubstituted) $d$ represents a positive integer of from 1 to 2 and X represents an anion. I then condense the quaternary compound with a heterocyclic compound containing 5 to 6 atoms in the heterocyclic ring and containing a ketomethylene group in the heterocyclic ring. This condensation gives complex merocyanine dyes containing three or four heterocyclic nuclei, i. e. merocyanine dyes of the following general formula:

XI.

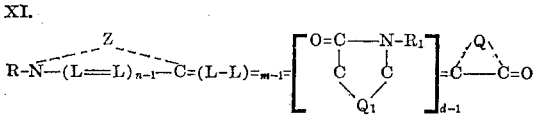

wherein R, L, $n$, $m$, Z, $Q_1$, $R_1$, and Q have the values set forth above and $d$ represents a positive integer of from 2 to 3.

The condensations of the quaternary alkylmercapto compounds with the ketomethylene compounds are advantageously carried out in the presence of a basic condensing agent, e. g. a trialkylamine or a N-alkylpiperidine or an alkali metal carbonate, using a lower molecular weight alcohol as reaction medium.

The following examples will serve to illustrate further my new dyes and the manner of obtaining the same.

*Example 1.—5-[(3-β-carboxyethyl-2(3)-benzothiazolylidene) - ethylidene] - 3 - ethylrhodanine*

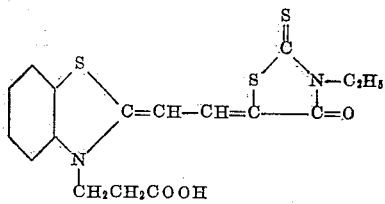

1.75 g. (1 mol.) of 2-methylbenzothiazole β-carboxyethiodide, 1.5 g. (1 mol.) of 5-acetanilidomethylene-3-ethylrhodanine, 1.0 g. (1 mol.) of triethylamine and 25 cc. absolute ethyl alcohol were refluxed together for 15 minutes. The crimson solution was cooled to room temperature, the dye precipitated by adding 5 cc. of 20 per cent HCl and the mixture chilled to 0° C. The dye was collected on a filter, washed with water and methyl alcohol and dried. The yield of violet crystals was 1.5 g., 76 per cent. The crude dye was dissolved in 200 cc. of hot methyl alcohol containing an excess of triethylamine, filtered and the acid form of the dye precipitated from the chilled filtrate with excess 20 per cent HCl. The product was filtered off, washed on the filter with water and methyl alcohol and dried. The dye was thus obtained as a purple felt of crystals melting with decomposition at 182–184° C. The yield of purified dye was 1.3 g., 66 per cent. The dye was a sensitizer for a gelatino-silver-bromiodide emulsion to 640 mμ with maxima at 540 and 595 mμ.

*Example 2.—5-[(3-carboxymethyl-2(3)-benzoxazolylidene) ethylidene]-3-ethylrhodanine*

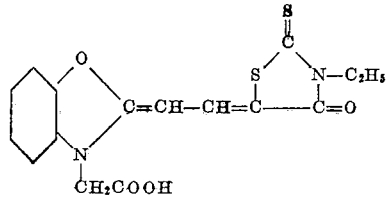

4.2 g. (1 mol.) of 2-β-acetanilidovinylbenzoxazolecarboxymethobromide, 1.6 g. (1 mol.) of 3-ethylrhodanine, 1.0 g. (1 mol.) of triethylamine and 25 cc. absolute ethyl alcohol were refluxed together for 10 minutes. The orange reaction mixture was cooled to room temperature, an excess of 15 per cent HCl added to precipitate the acid form of the dye and the mixture chilled to 0° C. The orange crystals of dye were collected on a filter, washed on the filter with water and methyl alcohol and dried. The yield of crude dye was 2.2 g. (61 per cent.) The dye was purified by dissolving the triethylamine salt in methyl alcohol, filtering and precipitating the acid form of the dye with HCl. The purified dye was obtained as vermillion crystals melting with decomposition at 232–234° C. The yield of purified dye was 1.9 g., 53 per cent. The dye sensitized a gelatino-silver-bromiodide emulsion to 600 mμ with a maximum at 550 mμ.

*Example 3.—5-[(3-β-carboxyethyl-2(3-benzoxazolylidene) ethylidene]-3-ethylrhodanine*

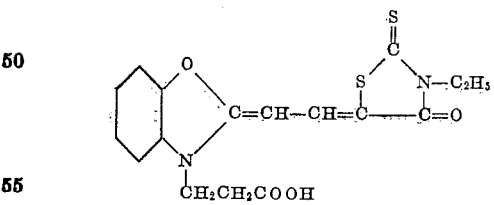

3.3 g. (1 mol.) of 2-methylbenzoxazole β-carboxyethiodide, 3.1 g. (1 mol.) of 5-acetanilidomethylene-3-ethylrhodanine, 1.0 g. (1 mol.) of triethylamine and 25 cc. of pyridine refluxed together for 15 minutes. The orange mixture was cooled to room temperature, poured into 100 cc. of 10 per cent HCl to precipitate the acid form of the dye and chilled to 0° C. The dye was filtered off, washed on the filter with water and methyl alcohol and dried. The yield of crude dye was 1.7 g., 45 per cent. The product was purified by dissolving the triethylamine salt in methyl alcohol, filtering and precipitating the acid form of the dye with HCl. The yield of minute red crystals was 1.5 g., 40 per cent. The purified dye melted with decomposition at 211–213° C. The dye was a sensitizer for a gelatino-silver-bromiodide emulsion to 610 mμ with a maximum at 550 mμ.

*Example 4.—5-[(3-carboxymethyl-2(3)-α-naphthothiazolylidene) - ethylidene] - 3-ethylrhodanine*

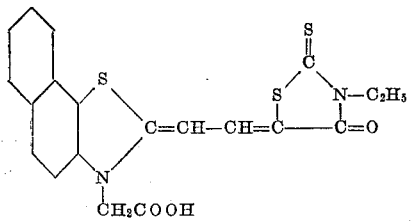

1.7 g. (1 mol.) of 2-methyl-α-naphthothiazole carboxymethobromide, 1.5 g. (1 mol.) of 5-acetanilidomethylene-3-ethylrhodanine, 1.0 g. (2 mols.) of triethylamine and 50 cc. of absolute ethyl alcohol were refluxed together for 15 minutes. The purple solution was cooled to room temperature, 5 cc. of 20 per cent HCl added and the mixture chilled to 0° C. The green crystals of the acid form of the dye were collected on a filter, washed with water and methyl alcohol and dried. The yield of crude dye was 1.6 g., 73 per cent. The dye was purified by solution of the triethylamine salt in methyl alcohol, filtration and precipitation of the acid form of the dye with HCl. The purified dye was obtained as green crystals melting with decomposition at 269–272° C. with softening from 240° C. The yield of purified material was 1.2 g., 54 per cent. The dye sensitized a gelatino-silver-bromiodide emulsion to 660 mμ with maxima at 540 and 615 mμ.

*Example 5.—5-[(3-β-carboxyethyl-2(3)-thiazolinylidene) ethylidene]-3-ethylrhodanine*

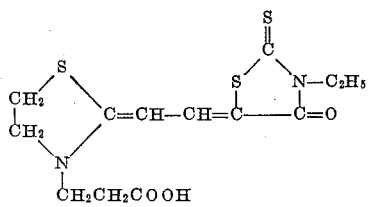

3.0 g. (1 mol.) of 2-methylthiazoline β-caboxyethiodide, 3.1 g. (1 mol.) of 5-acetanilidomethylene-3-ethylrhodanine, 1.0 g. (1 mol.) of triethylamine and 25 cc. of pyridine were refluxed together for one hour. The orange mixture was cooled to room temperature, poured into 200 cc. cold 10 per cent HCl and chilled to 0° C. The acid form of the dye was thus precipitated as a sticky orange solid. The aqueous solution was decanted off and the residue was recrystallized from 100 cc. absolute ethyl alcohol. The crude dye was obtained as orange crystals in a yield of .6 g., 18 per cent. After a further recrystallization from methyl alcohol (185 cc. per gram of dye) the product melted at 208–210° C. with decomposition. The yield of purified dye was .4 g., 12 per cent. The dye was a sensitizer for a gelatino-silver-bromiodide emulsion to 565 mμ with a sharp maximum at 540 mμ.

*Example 6.—3 - β - carboxyethyl-5-[(3-carboxymethyl - 2(3)-benzoxazolylidene) ethylidene]-rhodanine*

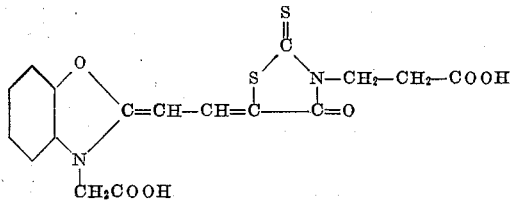

4.2 g. (1 mol.) of 2-β-acetanilidovinylbenzoxazole carboxymethobromide, 2.05 g. (1 mol.) of 3-β-carboxyethylrhodanine, 1.0 g. (1 mol.) of triethylamine and 25 cc. absolute ethyl alcohol were refluxed for 15 minutes. The orange mixture was cooled to room temperature and the acid form of the dye precipitated by addition of 5 cc. of 20 per cent HCl. After chilling to 0° C. the dye was filtered off, washed with water and methyl alcohol and dried. The yield of orange crystals was 1.0 g., 25 per cent. The dye was dissolved in 200 cc. methyl alcohol containing excess triethylamine, filtered and the acid form of the dye precipitated by adding excess dilute HCl. The purified dye was obtained as orange crystals melting with decomposition at 226–228° C. The yield of purified dye was .4 g., 10 per cent. The dye is a sensitizer for a gelatino-silver-bromiodide emulsion to 600 mμ with a maximum at 550 mμ.

*Example 7.—4 - [(3-β-carboxyethyl-2(3)-benzothiazolylidene)-ethylidene]-3-methyl-1 - phenyl-5-pyrazolone*

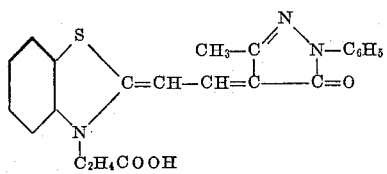

1.2 g. (1 mol.) of 2-methylbenzothiazole β-carboxyethiodide, 1.1 g. (1 mol.) of 4-acetanilidomethylene-3-methyl-1-phenyl-5-pyrazolone, .6 g. (2 mols.) of triethylamine and 25 cc. of absolute ethyl alcohol were boiled together under reflux for 30 minutes. The pink reaction mixture was cooled to room temperature, diluted to 300 cc. with 10 per cent acetic acid and chilled to 0° C. The red crystals of dye were collected on a filter, washed on the filter with water and dried. The yield was 1.3 g., 96 per cent. After recrystallization from methyl alcohol (500 cc. per gram of dye) the product was obtained as red crystals which melted with decomposition at 238–240° C. The yield of purified material was 1.1 g., 82 per cent. The dye is a sensitizer to 520 mμ for a gelatino-silver-bromiodide emulsion.

*Example 8.—4-[(1-β-carboxyethyl-3,3-dimethyl-2(1)-indolylidene)-ethylidene]-3 - methyl - 1 - phenyl-5-pyrazolone*

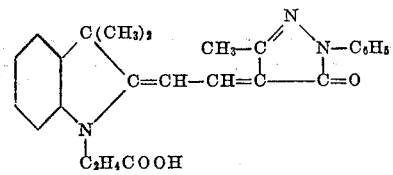

1.2 g. (1 mol.) of 2,3,3-trimethylindolenine-β-carboxyethiodide, 1.1 g. (1 mol.) of 4-acetanilidomethylene-3-methyl-1-phenyl-5-pyrazolone, .6 g. (2 mols.) of triethylamine and 25 cc. of absolute ethyl alcohol were boiled together under reflux for 30 minutes. The reaction mixture was chilled to room temperature, diluted to 300 cc. with 10 per cent acetic acid and chilled to 0° C. The orange crystals of dye were collected on a filter, washed on the filter with water and dried. The yield of dye was 1.2 g., 87 per cent. After recrystallization from methyl alcohol (66 cc. per gram of dye) the product was obtained as yellow needles which melted with decomposition at 156–

157° C. The yield of purified dye was .75 g., .54 per cent. The dye did not sensitize a gelatino-silver-chloro-bromiodide emulsion.

*Example 9.— 5-[(3-β-carboxyethyl-5-chloro-2-(3)-benzothiazolylidene)-1,3-butadienylidene]-rhodanine*

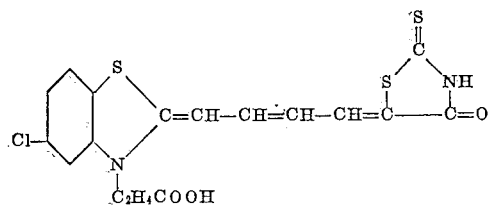

5.54 g. (1 mol.) of 2-(4-acetanilido-1,3-butadienyl)-5-chlorobenzothiazole β-carboxyethiodide, 1.33 g. (1 mol.) of rhodanine, 2.0 g. (2 mols.) of triethylamine and 50 cc. of absolute ethyl alcohol were boiled together under reflux for 15 minutes. Crystals of dye separated from the boiling solution. The mixture was chilled to 0° C. and diluted to 300 cc. with 10 per cent acetic acid. The dye was collected on a filter, washed on the filter with methyl alcohol and dried. The yield of dark blue solid was 3.0 g., 71 per cent. For purification the dye was dissolved in hot methyl alcohol containing an excess of triethylamine beyond that required to form the salt of the dye. The hot solution was filtered and the dye precipitated from the cooled solution by addition of acetic acid. The yield of purified dye was 2.6 g., 62 per cent. The dye melted at 197–200° C. with decomposition. The dye had no sensitizing action in a gelatino-silver-bromiodide emulsion. The 2-(4-acetanilido-1,3-butadineyl)-5-chlorobenzothiazole β-carboxyethiodide used herein was prepared as follows: 38.35 g. of 5-chloro-2-methyl-benzothiazole-β-carboxyethiodide, 25.85 g. (1 mol.) of β-anilinoacroleinanilhydrochloride and 150 cc. of acetic anhydride were boiled together under reflux for 15 minutes. The brown solution was cooled, diluted to 500 cc. with ether and chilled to 0° C. The ether solution was decanted from the sticky precipitate and the latter was boiled up with 50 cc. of acetone. The acetone solution was chilled with stirring in an ice bath whereupon crystals separated. After standing for 3 hours, the product was collected on a filter, washed on the filter with acetone and dried. The yield of green crystals was 20.4 g., 37 per cent.

*Example 10.— 5-[(3-β-carboxyethyl-2(3)-benzothiazolylidene)isopropylidene]-3-ethylrhodanine*

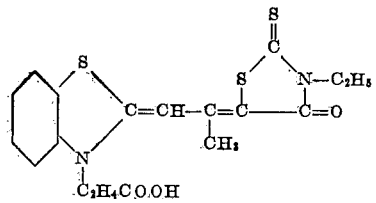

1.4 g. (1 mol.) of 3-β-carboxyethyl-2-thioacetyl-methylenebenzothiazoline and .93 g. (1 mol.) of methyl-p-toluenesulfonate were heated together on the steam bath for 30 minutes. .8 g. (1 mol.) of 3-ethyl rhodanine, .5 g. (1 mol.) of triethylamine and 25 cc. of absolute ethyl alcohol were added and the mixture was boiled under reflux for 30 minutes. The red reaction mixture was cooled to room temperature, 10 cc. of glacial acetic acid were added and the mixture was chilled to 0° C. The product was collected on a filter, washed on the filter with methyl alcohol and dried. The yield of green crystals was 1.8 g., 88 per cent. The dye was purified by dissolving it in 200 cc. of hot methyl alcohol containing 2 cc. of triethylamine, filtering the solution and precipitating the dye by addition of 5 cc. of glacial acetic acid. The purified dye melted with decomposition at 219–221° C. The yield of purified material was 1.5 g., 74 per cent. The dye sensitized a gelatino-silver-bromiodide emulsion from 500 to 620 mμ with a maximum at 540 mμ.

*Example 11.— 5-[(3-β-carboxyethyl-2(3)-benzothiazolylidene)-α-ethylethylidene]-3-ethylrhodanine*

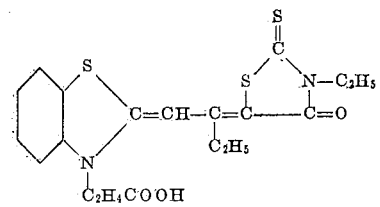

1.45 g. (1 mol.) of 3-β-carboxyethyl-2-thiopropionylmethylenebenzothiazoline and .9 g. (1 mol.) of methyl p-toluenesulfonate were heated on the steam bath for one hour. The red solid product was washed by decantation with 25 cc. of ether. .8 g. (1 mol.) of 3-ethylrhodanine, .5 g. (1 mol.) of triethanolamine and 25 cc. of absolute ethyl alcohol were added and the mixture boiled under reflux for 15 minutes. The product was isolated and purified in the same manner as Example 10. The yield of crude red crystals was 1.4 g., 67 per cent. The purified product melted at 229–230° C. with decomposition. The yield of purified material was 1.3 g., 62 per cent. The dye is a sensitizer in a gelatino-silver-bromiodide emulsion from 500 to 620 mμ.

*Example 12.— 5-[(3-β-carboxyethyl-2(3)-benzothiazolylidene)-α-ethylethylidene]-3-ethyl-2-thio-2,4(3,5)-oxazoledione*

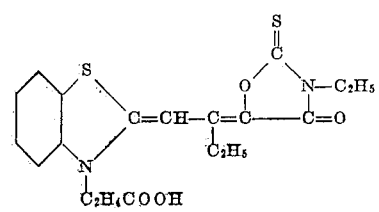

1.45 g. (1 mol.) of 3-β-carboxyethyl-2-thiopropionylmethylenebenzothiazoline and .9 g. (1 mol.) of methyl-p-toluenesulfonate were heated on the steam bath for one hour. The red solid product was washed by decantation with 25 cc. of ether. .73 g. (1 mol.) of 3-ethyl-2-thio-2,4(3,5)-oxazoledione, .5 g. (1 mol.) of triethylamine and 25 cc. of absolute ethyl alcohol were added and the mixture boiled under reflux for 19 minutes. The product was isolated and purified in the same manner as Example 10. The yield of crude pink crystals was .9 g., 44 per cent. The purified product melted with decomposition at 226–227° C. The yield of purified material was 6 g., 29 per cent. The dye is a sensitizer for a gelatino-silver-bromiodide emulsion from 500 to 570 mμ.

*Example 13.—5-[(1-carboxymethyl-4(1-quinolylidene)ethylidene]-3-ethylrhodanine*

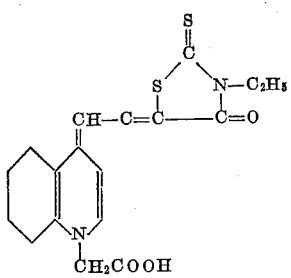

2.8 g. (1 mol.) of lepidine carboxymethobromide, 3.1 g. (1 mol.) of 5-acetanilidomethylene-3-ethylrhodanine, 2.0 g. (2 mols.) of triethylamine and 25 cc. of absolute ethyl alcohol were boiled together under reflux for 1 hour. The mixture was cooled to room temperature, 10 cc. of glacial acetic acid added and chilled to 0° C. The dye was collected on a filter, washed on the filter with methyl alcohol and water and dried. The yield of dull blue crystals was 2.4 g., 65 per cent. For purification the dye was dissolved in 50 cc. hot methyl alcohol containing 1 cc. of triethylamine, filtered and precipitated by adding 5 cc. of glacial acetic acid. The yield of purified material was 2.0 g., 54 per cent. The purified dye melted at 195–197° C. with decomposition. The dye is a sensitizer from 540 to 670 m$\mu$ with a maximum at 650 m$\mu$ in a gelatino-silver-bromiodide emulsion.

*Example 14.—5-[(3-β-carboxyethyl-2(3)-benzothiazoylidene)-ethylidene]-3-ethyl-1-phenyl-2-thiohydantoin*

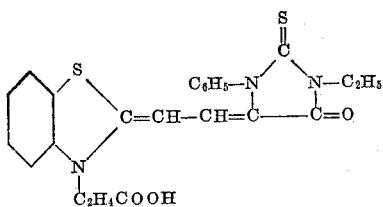

3.5 g. (1 mol.) of 2-methylbenzothiazole-β-carboxyethiodide, 3.65 g. (1 mol.) of 5-acetanilidomethylene-3-ethyl-1-phenyl-2-thiohydantoin, 2.0 g. (2 mols.) of triethylamine and 25 cc. of absolute ethyl alcohol were boiled together under reflux for 1 hour. The dye was isolated in the same manner as Example 13. The yield of green crystals of crude dye was 3.4 g. 76 per cent. The dye was recrystallized from glacial acetic acid (52 cc. per gram). The yield of purified dye was 2.4 g., 53 per cent. The pure dye melted at 221–223° C. with decomposition. The dye is a sensitizer to 560 m$\mu$ with a maximum at 520 m$\mu$ in a gelatino-silver-chloro-bromiodide emulsion.

*Example 15.—5-[(3-β-carboxyethyl-2(3)-benzothiazolylidene)-ethylidene]-3-ethyl-2-thio-2,4(3,5)-oxazoledione*

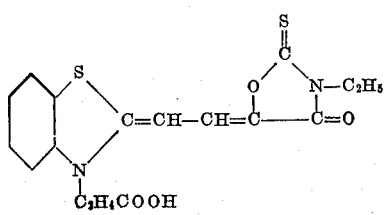

3.5 g. (1 mol.) of 2-methylbenzothiazole-β-carboxyethiodide, 2.9 g. (1 mol.) of 5-acetanilidomethylene-3-ethyl-2-thio-2,4(3,5)-oxazoledione, 2.0 g. (2 mols.) of triethylamine and 25 cc. of absolute ethyl alcohol were boiled together under reflux for 1 hour. The mixture was diluted with 300 cc. of 10 per cent acetic acid and chilled to 0° C. The product was collected on a filter, washed on the filter with alcohol and water and dried. The yield of red crystals was 3.7 g., 98 per cent. The dye was recrystallized from glacial acetic acid (50 cc. per gram). The yield of purified material was 2.0 g., 53 per cent. The pure dye melted at 226–227° C. with decomposition. The dye is a sensitizer from 500 to 630 m$\mu$ with a maximum at 550 m$\mu$ in a gelatino-silver-bromiodide emulsion.

*Example 16.—5-[(5-chloro-3-β-sulfoethyl-2(3)-benzothiazolylidene)-ethylidene]-3-ethylrhodanine triethylamine salt*

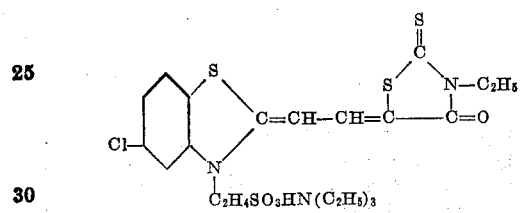

1.86 g. (1 mol.) of 5-chloro-2-methylbenzothiazole-β-sulfoethylbromide, 1.5 g. (1 mol.) of 5-acetanilidomethylene-3-ethylrhodanine, 1.0 g. (2 mols.) of triethylamine and 15 cc. of absolute ethyl alcohol were boiled under reflux for 15 minutes. The reaction mixture was cooled, diluted with 150 cc. of ether and chilled to 0° C. The dye was collected on a filter, washed with absolute ethyl alcohol and dried. The yield of red crystals with a golden reflex was .5 g., 18 per cent. After recrystallization from methyl alcohol (70 cc. per gram) the product melted with decomposition at 267°–269° C. The yield of purified material was .3 g., 11 per cent. The dye is a sensitizer in a gelatino-silver-bromiodide emulsion from 500 to 630 m$\mu$ with maxima at 540 and 580 m$\mu$.

*Example 17.—5-[(3-β-carboxyethyl-2(3)-benzoxazolylidene)-ethylidene]-3-ethyl-5-(3-ethyl-4-oxo-2-thiono-5-thiazolylidene)-4-thiazolidone*

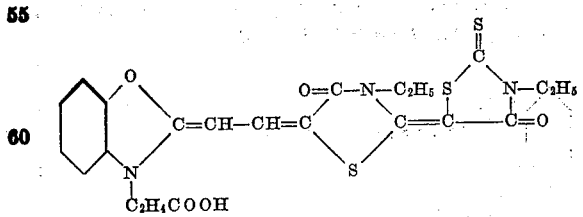

1.0 g. (1 mol.) of 5-[(3-β-carboxyethyl-2(3)-benzoxazolylidene)ethylidene]-3-ethylrhodanine and 1.0 g. (1 mol. plus excess) of methyl-p-toluenesulfonate were heated together in an oil bath at 140° C. for 20 minutes. The red liquid product was cooled, washed by decantation with 50 cc. of ether and the residue dissolved in 25 cc. of pyridine. .43 g. (1 mol.) of 3-ethylrhodanine and 1.0 g. (2 mols. plus excess) of triethylamine were added to the pyridine solution and the mixture boiled under reflux for 5 minutes. The purple reaction mixture was cooled to room temperature, poured into 500 cc. of 10 per cent acetic acid and chilled to 0° C. The dye was collected on a filter, washed on the filter with methyl alcohol and dried. The yield of blue crystals was .8 g., 60 per cent. The dye was recrystallized from glacial acetic acid. (190 cc. per gram.) The purified dye was obtained as dark green crystals which melted at 292–294° C. with decomposition. The yield of purified dye was .5 g., 37 per cent. The dye is a sensitizer from 510 to 600 m$\mu$ with a maximum at 610 m$\mu$ in a gelatino-silver-bromiodide emulsion.

*Example 18.—5-(3-$\beta$-carboxyethyl-2(3)-benzothiazolylidene)-3-ethylrhodanine*

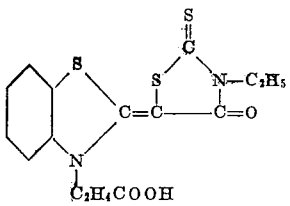

11.35 g. (1 mol.) of 2-phenylmercaptobenzothiazole and 10.0 g. (1 mol.) of $\beta$-iodopropionic acid were heated together in a test tube over a gas flame for 3 minutes. The dark brown viscous product was cooled to room temperature. 7.5 g. (1 mol.) of 3-ethylrhodanine, 9.35 g. (2 mols.) of triethylamine and 25 cc. of absolute ethyl alcohol were added and the mixture was boiled with stirring for 5 minutes. The reaction mixture was cooled, poured into 300 cc. of 10 per cent acetic acid and chilled to 0° C. The sticky brown precipitate was stirred with two 300-cc. portions of cold water and finally boiled up with 100 cc. of methyl alcohol. The alcohol solution was chilled to 0° C., the dye filtered off and washed on the filter with methyl alcohol. The yield of brown crystals was 3.7 g., 22 per cent. The dye was purified by dissolving in 150 cc. methyl alcohol plus 3 cc. of triethylamine, filtering the solution and precipitating the product by adding excess glacial acetic acid. The yield of brown crystals melting at 254–256° C. with decomposition was 3.0 g., 18 per cent. The dye is a sensitizer to 500 m$\mu$ with a maximum at 470 m$\mu$ in a gelatino-silver-chlorobromiodide emulsion.

*Example 19.—5-[(3-$\beta$-carboxyethyl-2(3)-benzoxazolylidene)-2,4-hexadienylidene]-1,3-diphenyl-2-thiobarbituric acid*

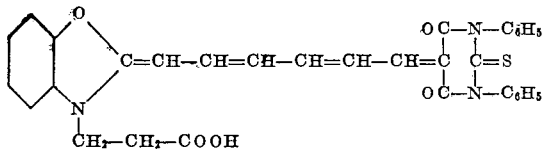

4.9 g. (1 mol.) of 5-(5-acetanilido-2,4-pentadienylidene)-1,3-diphenyl-2-thiobarbituric acid, 3.3 g. (1 mol.) of 2-methylbenzoxazole $\beta$-carboxyethiodide, 50 cc. of absolute ethyl alcohol and 2 g. (2 mol.) of triethylamine were boiled under reflux for 30 minutes. The reaction mixture was chilled and acidified with dilute (3 per cent) hydrochloric acid, whereupon the dye precipitated. The dye was filtered off, washed with water, methyl alcohol and dried. Yield 18 per cent. The dye was suspended in warm methyl alcohol and sufficient triethylamine added to produce a solution of the dye as its triethylamine salt. The triethylamine salt solution was filtered and then acidified with dilute hydrochloric acid, whereupon the dye precipitated. The dye was again taken up in methyl alcohol and triethylamine and again precipitated by acidifying the solution. The dye was washed with methyl alcohol and obtained in 7 per cent yield as dark, almost black crystals, melting at 180 to 182° C. with decomposition. The dye had no sensitizing action on a gelatino-silver-halide emulsion.

*Example 20.—5-[(3-$\beta$-carboxyethyl-2(3)-benzoxazolylidene)-1,3-butadienylidene]-1,3-diethylbarbituric acid*

3.35 g. (1 mol.) of 5-$\gamma$-acetanilidoallylidene-1,3-diethylbarituric acid, 3.3 g. (1 mol.) of 2-methylbenzoxazole $\beta$-carboxyethiodide, 25 cc. of absolute ethyl alcohol and 2 g. (2 mol.) of triethylamine were boiled together under reflux for 15 minutes. The reaction mixture was chilled and acidified with 10 per cent acetic acid, whereupon the dye precipitated. The dye was filtered off, washed with methyl alcohol and dried. Yield 12 percent. The dye was suspended in warm methyl alcohol and sufficient triethylamine added to produce a solution of the dye as its triethylamine salt. The triethylamine salt solution was filtered and then acidified with 10 per cent acetic acid, whereupon the dye precipitated. The dye was again taken up in methyl alcohol and triethylamine and again precipitated by acidifying the solution. The dye was washed with methyl alcohol and obtained in 8 per cent yield as minute dark red crystals, melting at 267 to 269° C. with decomposition. The dye had no sensitizing action on a photographic silver halide emulsion.

In the preparation of photographic silver halide emulsions containing the acid merocyanine dyes, it is only necessary to disperse the dyes in the emulsions. Ordinarily this is advantageously accomplished by forming a water-soluble salt of the acid merocyanine dye and dissolving the water-soluble salt in water, methanol or ethanol, or a mixture of water and methanol and ethanol, and dispersing the resulting solution in the emulsion. The salts are advantageously formed by adding to the acid merocyanine dye, wet with a little water, methanol or ethanol, an alkali metal hydroxide, e. g. sodium or potassium hydroxide, or ammonium hydroxide, or an amine, e. g. methylamine, ethylamine, dimethylamine, diethylamine, trimethylamine, triethylamine, ethanolamine, diethanolamine, triethanolamine, pyridine, N-methylpiperidine, n-propylamine, isopropylamine, butylamine, $\beta$-ethoxyethylamine, etc., and taking up the salt which forms in a suitable solvent, e. g. water, methanol, ethanol, a mixture of water and methanol, a mixture of water and ethanol, etc.

Sensitization by means of my new acid merocyanine dyes is primarily directed to the ordinarily employed gelatino-silver-halide developing-out emulsions, e. g. gelatino-silver-chloride, -chlorobromide, -chlorobromiodide, -bromide and bromiodide developing-out emulsions. The acid dyes or their salts are advantageously added to the washed, finished emulsions and should, of course, be uniformly distributed throughout the emulsion.

The concentration of these compounds in the emulsion can vary widely, e. g. from about 5 to about 100 mg. per liter of flowable emulsion.

The concentration of the dye will vary according to the type of light-sensitive material and according to the effects desired. The suitable and most economical concentration for any given emulsion will be apparent to those skilled in the art, upon making the ordinary tests and observations customarily used in the art of emulsion making. To prepare a gelatino-silver-halide emulsion sensitized with one of my new dyes, the following procedure is satisfactory: a quantity of the dye in salt form is dissolved in water, methyl alcohol, ethyl alcohol, a mixture of methyl alcohol and water or a mixture of ethyl alcohol and water, and a volume of the solution containing from 5 to 100 mg. of dye is slowly added to about 1000 cc. of a gelatino-silver-halide emulsion with stirring. Stirring is continued until the dye is uniformly dispersed. With the more powerful of my new sensitizing dyes, 10 to 50 mg. of dye per 1000 cc. of emulsion suffice to produce the maximum sensitizing effect with the ordinary gelatino-silver-halide emulsions. The above statements are only illustrative and are not to be understood as limiting my invention in any sense, as it will be apparent that my new dyes can be incorporated by other methods in many of the photographic emulsions customarily employed in the art, such, instance, as by bathing a plate or film upon which an emulsion is coated, in a solution of the dye (or its salt form) in an appropriate solvent, although such a method is ordinarily not to be preferred. The emulsion claims are intended to cover any combination of these new dyes with a photographic silver halide emulsion whereby the dyes exert a sensitizing effect on the emulsion.

In the processes for preparing dyes described above, the cyclammonium carboxyalkyl or sulfoalkyl salts can be employed in their forms wherein the carboxyl or sulfo group is in the form of a metal or ammonium salt. Actually in the foregoing examples where the condensations are carried out in the presence of a basic condensing agent, the basic condensing agent is partially used up in forming a salt of carboxyl or sulfo group. For this reason, one molecular proportion of the basic condensing agent for each molecular proportion cyclammonium carboxyalkyl or sulfoalkyl salt plus one molecular proportion of basic condensing agent for each carboxyl or sulfo group present, is employed.

The thioketones, such as 3-β-carboxyethyl-2-thiopropionylmethylenebenzothiazoline and 3-β-carboxyethyl-2-thioacetylmethylenebenzothiazoline, which I employ herein are described in my copending application Serial No. 730,568, now Patent 2,481,698, September 13, 1949, filed of even date herewith. The compounds containing an intracyclic ketomethylene group and a carboxyalkyl or a sulfoalkyl group, e. g. 3-β-carboxyethylrhodanine, which I employ herein in practicing my invention are described in the copending application of Leslie G. S. Brooker and Frank L. White, Serial No. 605,472, filed July 16, 1945 (now United States Patent No. 2,493,747, dated January 10, 1950) and in the copending application of Leslie G. S. Brooker and Grafton H. Keyes, Serial No. 605,473, filed July 16, 1945 (now United States Patent No. 2,493,748, dated January 10, 1950). 2-methyl-4-phenylbenzothiazole and quaternary salts thereof are described in the copending application of Gertrude Van Zandt and Leslie G. S. Brooker, Serial No. 709,414, filed November 13, 1946 (now United States Patent No. 2,485,679, dated October 25, 1949). 2-methyl-5-phenylbenzothiazole and quaternary salts thereof are described in the copending application of Gertrude Van Zandt and Leslie G. S. Brooker, Serial No. 711,816, filed November 22, 1946, now Patent No. 2,515,913, July 18, 1950.

The cyclammonium sulfoalkyl quaternary salts can be prepared, for example, by heating a heterocyclic nitrogen base containing a reactive methyl group (i. e. a methyl group in the α- or γ-position) with a halogenoalkanesulfonic acid, e. g. 2-bromoethanesulfonic acid, 2-chloroethanesulfonic acid, p-sulfobenzyl bromide, etc. In preparing these quaternary salts it is essential to heat at rather high temperatures and in the case of the halogenoethanesulfonic acids to heat for a short time, e. g. 5 to 10 minutes. Temperatures from 160 to 220° C. are advantageously employed. With p-sulfobenzyl halides much longer times of heating can be employed and advantageously are employed. The preparation of typical of these cyclammonium sulfoalkyl quaternary salts is further illustrated in the following examples:

*Example 21.—5-chloro-2-methylbenzothiazole p-sulfobenzyl bromide*

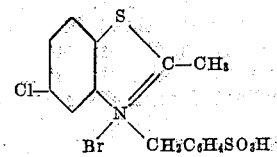

18.4 g. (1 mol.) of 5-chloro-2-methylbenzothiazole and 25.1 g. (1 mol.) of p-sulfobenzylbromide were heated together at 160° C. in an oil bath for 12 hours. The brown viscous product was stirred with 50 cc. of acetone until crystalline, chilled to 0° C. and filtered. The product was washed on the filter with acetone and dried in vacuum over calcium chloride. The yield of gray hygroscopic solid was 9.1 g., 31 per cent. The p-sulfobenzyl bromide employed above can be prepared as follows. 86.0 g. (1 mol.) of p-toluenesulfonic acid and 400 g. of bromoform were heated to 140° C. in an oil bath. The mixture was stirred mechanically while 80 g. (1 mol.) of bromine was added dropwise over a period of 30 minutes. The mixture was heated and stirred 30 minutes longer, during which time the color of the bromine disappeared. The mixture was chilled to 0° C. the product collected on a filter, washed on the filter with 15 cc. of bromoform and dried in a vacuum over potassium hydroxide sticks. The yield of hygroscopic gray solid product was 53.3 g., 42 per cent.

*Example 22.—2-methylbenzothiazole p-sulfobenzylbromide*

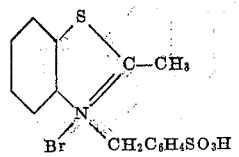

This was prepared as in Example 21 from 16.4 g. (1 mol.) of 2-methylbenzothiazole and 27.6 g. (1 mol.) of p-sulfobenzyl bromide. The yield of brownish crystals was 4.8 g., 11 per cent.

Example 23.—*Lepidine p-sulfobenzylbromide*

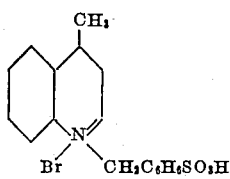

This was prepared as in Example 21 from 14.3 g. (1 mol.) of lepidine and 25.1 g. (1 mol.) of p-sulfobenzyl bromide. The yield of yellow crystals was 6.6 g., 17 per cent.

Example 24.—*5-chloro-2-methylbenzothiazole-β-sulfoethylbromide*

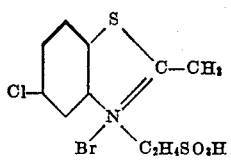

18.35 g. (1 mol.) of 5-chloro-2-methylbenzothiazole and 18.9 g. (1 mol.), of 2-bromoethanesulfonic acid were heated over a flame until the temperature of the melt reached 220° C. The temperature was maintained between 200 and 220° C. for 5 minutes, the mixture was cooled, crushed under acetone and chilled to 0° C. The product was collected on a filter, washed on the filter with acetone and dried. The yield of pinkish crystals was 25 6 g., 69 per cent. The 2-bromoethanesulfonic acid employed above can be prepared as follows. 110 g. (1 mol.) of finely powdered sodium 2-bromoethane sulfonate, 200 g. (1 mol. plus 10 per cent excess) of a 10 per cent solution of dry hydrogen chloride in absolute ethyl alcohol and 1000 cc. of absolute ethyl alcohol were stirred mechanically for one hour at room temperature. The precipitated sodium chloride was filtered off, washed on the filter with absolute ethyl alcohol and the filtrate and washings concentrated as far as possible on the steam bath using the water pump. The mixture was diluted with 500 cc. of dry benzene and again concentrated under reduced pressure. The residue was distilled slowly under as high a vacuum as possible. The product was a heavy oil which solidified to colorless crystals on cooling. The product boiled at 160 to 162° C. at 2 mm. pressure. The yield of crude product was 89.8 g., 91 per cent and 65.0 g., 66 per cent after one distillation.

Example 25.—*2-methyl-α-naphthothiazole-β-sulfoethylbromide*

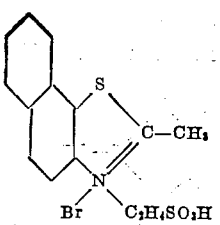

This was prepared as in Example 21 from 19.9 g. (1 mol.) of 2-methyl-α-naphthothiazole and 18.9 g. (1 mol.) of 2-bromoethane sulfonic acid. The yield of brown crystals was 30.7 g., 79 per cent.

Example 26.—*2-methylbenzothiazole-β-sulfoethylbromide*

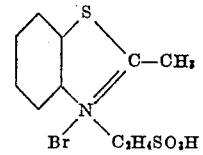

This was prepared as in Example 21 from 14.9 g. (1 mol.) of 2-methylbenzothiazole and 18.9 g. (1 mol.) of 2-bromoethane sulfonic acid. The yield of gray crystals was 6.6 g., 20 per cent.

Example 27.—*2,3,3-trimethylindolenine-β-sulfoethylbromide*

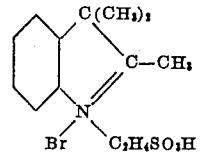

This was prepared as in Example 21 from 15.9 g. (1 mol.) of 2,3,3-trimethylindolenine and 18.0 g. (1 mol.) of 2-bromoethanesulfonic acid. The yield of pink crystals was 16.6 g., 48 per cent.

The cyclammonium carboxyalkyl quaternary salts can be prepared by the methods disclosed in the prior art and also by hydrolysis of the corresponding carbalkoxyalkyl compounds. The following example illustrates further the preparation of the cyclammonium carboxyalkyl quaternary salts by the hydrolysis of the corresponding cyclammonium carbalkoxyalkyl quaternary salts.

Example 28.—*Lepidine carboxymethobromide*

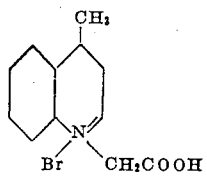

20.0 g. (1 mol.) of lepidine carbethoxymethobromide and 100 cc. of 48 per cent hydrobromic acid were boiled together under reflux for 30 minutes. The mixture was concentrated nearly to dryness under reduced pressure and the sticky brown product dissolved in 100 cc. of absolute ethyl alcohol. The solution was chilled to 0° C., the product collected on a filter and washed on the filter with alcohol. The yield of tan crystals was 13.7 g., 75 per cent.

The cyclammonium carbalkoxyalkyl quaternary salts can be prepared by known methods.

The cyclammonium sulfoalkyl bromides set forth above can be converted to the corresponding iodides by adding to a hot methyl alcoholic solution of the cyclammonium sulfoalkyl bromide a concentrated aqueous solution of potassium iodide. Conversion to the perchlorates can be similarly accomplished by adding to a hot methyl alcoholic solution of the cyclammonium sulfoalkyl bromide a concentrated aqueous solution of sodium perchlorate. Cyclammonium sulfoalkyl chlorides can be made from the cyclammonium sulfoalkyl bromides by stirring the bromides with a boiling methyl alcoholic suspension of silver chloride, filtering off the silver salts and isolating the cyclammonium sulfoalkyl chloride from the methyl alcoholic solution. Cyclammonium sulfoalkyl acetates and thiocyanates can be similarly prepared using silver acetate or silver thiocyanate.

What I claim as my invention and desire to be secured by Letters Patent of the United States:

1. The merocyanine dyes which are represented by the following general formula:

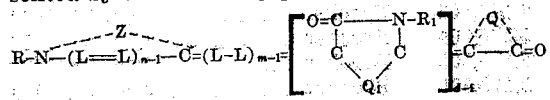

wherein R represents a member selected from the group consisting of carboxyalkyl and sulfoalkyl groups, L represents a methine group, $n$ represents a positive integer of from 1 to 2, $m$ represents a positive integer of from 1 to 4, $Q_1$ represents a member selected from the group consisting of an oxygen atom, a sulfur atom and a

group wherein $R_2$ represents a member selected from the group consisting of an alkyl group and an aryl group, $R_1$ represents a member selected from the group consisting of an alkyl group and an aryl group, $d$ represents a positive integer of from 1 to 2, Q represents the non-metallic atoms necessary to complete a heterocyclic nucleus selected from the group consisting of heterocyclic nuclei of the rhodanine series, the 2-thio-2,4-(3,5)-oxazoledione series and the 2-thiohydantoin series and Z represents the non-metallic atoms necessary to complete a heterocyclic nucleus selected from the group consisting of heterocyclic nuclei of the benzoxazole series, the benzothioazole series, the benzoselenazole series, the α-naphthoxazole series, the β-naphthoxazole series, the α-naphthothiazole series, the β-naphthothiazole series, the α-naphthoselenazole series, the β-naphthoselenazole series, the thiazoline series, the thiazole series, the selenazole series, the oxazole series, the quinoline series and the 3,3-dialkylindolenine series.

2. The merocyanine dyes which the represented by the following general formula:

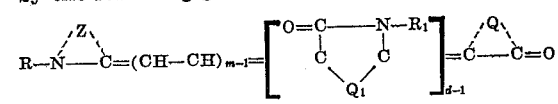

wherein R represents a carboxyalkyl group containing from 1 to 5 carbon atoms, $m$ represents a positive integer of from 1 to 4, $Q_1$ represents a member selected from the group consisting of an oxygen atom, a sulfur atom and a

group wherein $R_2$ represents a member selected from the group consisting of an alkyl group and an aryl group, $R_1$ represents a member selected from the group consisting of an alkyl group and an aryl group, $d$ represents a positive integer of from 1 to 2, Q represents the non-metallic atoms necessary to complete a heterocyclic nucleus selected from the group consisting of heterocyclic nuclei of the rhodanine series, the 2-thio-2,4,(3,5)-oxazoledione series and the 2-thiohydantoin series and Z represents the non-metallic atoms necessary to complete a heterocyclic nucleus selected from the group consisting of heterocyclic nuclei of the benzoxazole series, the benzothiazole series, the benzoselenazole series, the α-naphthoxazole series, the β-naphthoxazole series, the α-naphthothiazole series, the β-naphthothiazole series, the α-naphthoselenazole series, the β-naphthoselenazole series, the thiazoline series, the thiazole series, the selenazole series, the oxazole series, the quinoline series and the 3,3-dialkylindolenine series.

3. The merocyanine dyes which are represented by the following general formula:

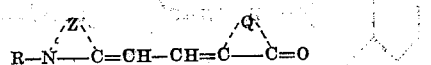

wherein R represents a carboxyalkyl group containing from 1 to 3 carbon atoms, Q represents the non-metallic atoms necessary to complete a heterocyclic nucleus of the rhodanine series and Z represents the non-metallic atoms necessary to complete a heterocyclic nucleus of the benzoxazole series.

4. The merocyanine dye represented by the following formula:

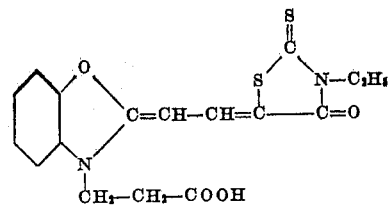

5. The merocyanine dyes which are represented by the following general formula:

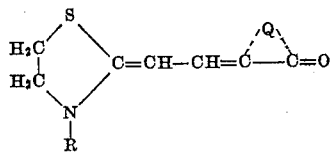

wherein R represents a carboxyalkyl group containing from 1 to 3 carbon atoms and Q represents the non-metallic atoms necessary to complete a heterocyclic nucleus of the rhodanine series.

6. The merocyanine dye which is represented by the following general formula:

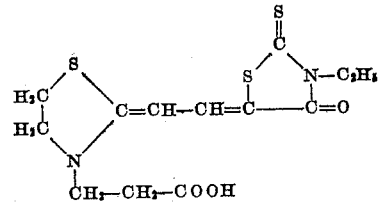

7. The merocyanine dye which is represented by the following formula:

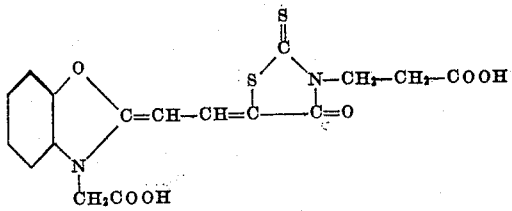

8. The merocyanine dye which is represented by the following chemical formula:

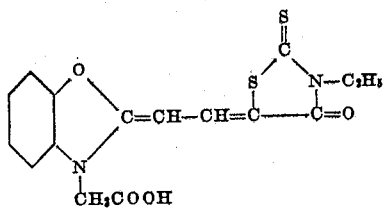

9. The merocyanine dye which is represented by the following chemical formula:
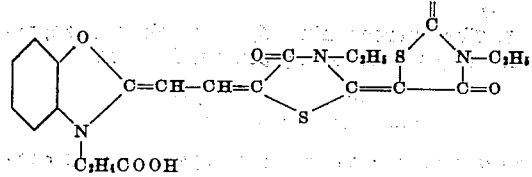
ROBERT H. SPRAGUE.
REFERENCES CITED
The following references are of record in the file of this patent:
UNITED STATES PATENTS
| Number | Name | Date |
|---|---|---|
| 2,170,803 | Brooker | Aug. 29, 1939 |
| 2,170,804 | Brooker | Aug. 29, 1939 |
| 2,170,805 | Brooker | Aug. 29, 1939 |
| 2,170,806 | Brooker | Aug. 29, 1939 |
| 2,170,807 | Brooker | Aug. 29, 1939 |
| 2,354,524 | Kumetat | July 25, 1944 |

Certificate of Correction

August 15, 1950

Patent No. 2,519,001

ROBERT H. SPRAGUE

It is hereby certified that error appears in the printed specification of the above numbered patent requiring correction as follows:

Columns 7 and 8, Formula X, extreme right-hand portion thereof, for "SH$_2$" read *SR$_2$*; column 12, line 73, for "6 g." read *.6 g.*; column 15, line 12, for "600 mµ" read *660 mµ*; column 17, line 28, after the word and comma "such," insert *for*; column 19, line 9, for that portion of Example 23 reading "CH$_2$C$_6$H$_6$SO$_3$H" read *CH$_2$C$_6$H$_4$SO$_3$H*; line 35, for "25 6 g." read *25.6 g.*; column 21, line 42, for "the" after "which" read *are*; and that the said Letters Patent should be read as corrected above, so that the same may conform to the record of the case in the Patent Office.

Signed and sealed this 21st day of November, A. D. 1950.

[SEAL]

THOMAS F. MURPHY,
*Assistant Commissioner of Patents.*